United States Patent
Barnett, Jr.

(10) Patent No.: US 11,123,852 B2
(45) Date of Patent: Sep. 21, 2021

(54) TWO-PIECE PINION TOOL

(71) Applicant: Freudenberg-NOK General Partnership, Plymouth, MI (US)

(72) Inventor: Roger Lee Barnett, Jr., Berlin Heights, OH (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 179 days.

(21) Appl. No.: 16/535,816

(22) Filed: Aug. 8, 2019

(65) Prior Publication Data

US 2021/0039239 A1   Feb. 11, 2021

(51) Int. Cl.
  *B23Q 3/00* (2006.01)
  *B25D 1/16* (2006.01)
  *F16H 19/04* (2006.01)
  *B62D 3/12* (2006.01)

(52) U.S. Cl.
  CPC ............... *B25D 1/16* (2013.01); *F16H 19/04* (2013.01); *B62D 3/12* (2013.01)

(58) Field of Classification Search
  CPC .... B25D 1/00; B25D 1/16; B25D 3/00; B25B 19/00; B25B 27/00; B23P 11/00
  See application file for complete search history.

(56) References Cited

U.S. PATENT DOCUMENTS

| | | | |
|---|---|---|---|
| 1,873,294 A | 8/1932 | Cosgrove | |
| 2,779,089 A | 1/1957 | Allen | |
| 4,283,827 A | 8/1981 | Abel | |
| 4,675,968 A * | 6/1987 | Bartlett | B25B 27/02 29/254 |
| 4,733,450 A | 3/1988 | Pool | |
| 4,936,003 A | 6/1990 | Gloe | |
| 5,072,503 A | 12/1991 | Milletics | |
| 5,251,368 A | 10/1993 | Somerville et al. | |
| 5,365,648 A | 11/1994 | Fuga | |
| 8,069,544 B2 * | 12/2011 | Sollami | B25D 1/16 29/254 |
| 9,009,938 B2 * | 4/2015 | Noyes | B25B 27/02 29/263 |
| 2021/0039239 A1 * | 2/2021 | Barnett, Jr. | B25D 1/16 |

* cited by examiner

*Primary Examiner* — Lee D Wilson
(74) *Attorney, Agent, or Firm* — Daniel J. Sepanik, Esq.; Harness, Dickey & Pierce, P.L.C.

(57) ABSTRACT

A two-piece pinion shaft tool for disassembling a two-piece pinion shaft from a rack and pinion housing includes a tool body having an axial opening extending along an axis of the tool body and a transverse opening at least partially communicating with the axial opening. The tool body includes internal threads within the axial opening. A pin is inserted in the transverse opening for engaging a keyway in a first shaft portion of the two-piece pinion shaft. A slide hammer includes a slide portion having external threads engaged with the internal threads of the tool body and a hammer portion disposed on the slide portion. The tool body further includes a first end with a first plurality of fingers extending axially from the tool body and includes a second end with a second plurality of fingers extending axially from the tool body.

8 Claims, 5 Drawing Sheets

TWO-PIECE PINION TOOL

FIELD

The present disclosure relates to a tool for disassembling a pinion shaft of a rack and pinion system.

BACKGROUND

This section provides background information related to the present disclosure which is not necessarily prior art.

Pinion shafts can include multiple shaft components that are press fit together and can be further retained within a power steering rack and pinion system by a specially designed retaining nut. Accordingly, it is desirable in the art to provide a tool to allow for the removal, maintenance, and repair of such a pinion shaft assembly from a rack and pinion system.

SUMMARY

This section provides a general summary of the disclosure, and is not a comprehensive disclosure of its full scope or all of its features.

A pinion tool for disassembling a pinion shaft from a rack and pinion system includes a tool body having an axial opening extending along an axis of the tool body and a transverse opening at least partially communicating with the axial opening. A pin is insertable in the transverse opening for engaging a keyway in a first shaft portion. The tool body includes internal threads within the axial opening. A slide hammer includes a slide portion having external threads engaged with the internal threads of the tool body and a hammer portion disposed on the slide portion. The tool body further includes a first end with a first plurality of fingers extending axially from the tool body and includes a second end with a second plurality of fingers extending axially from the tool body.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Figure 1:
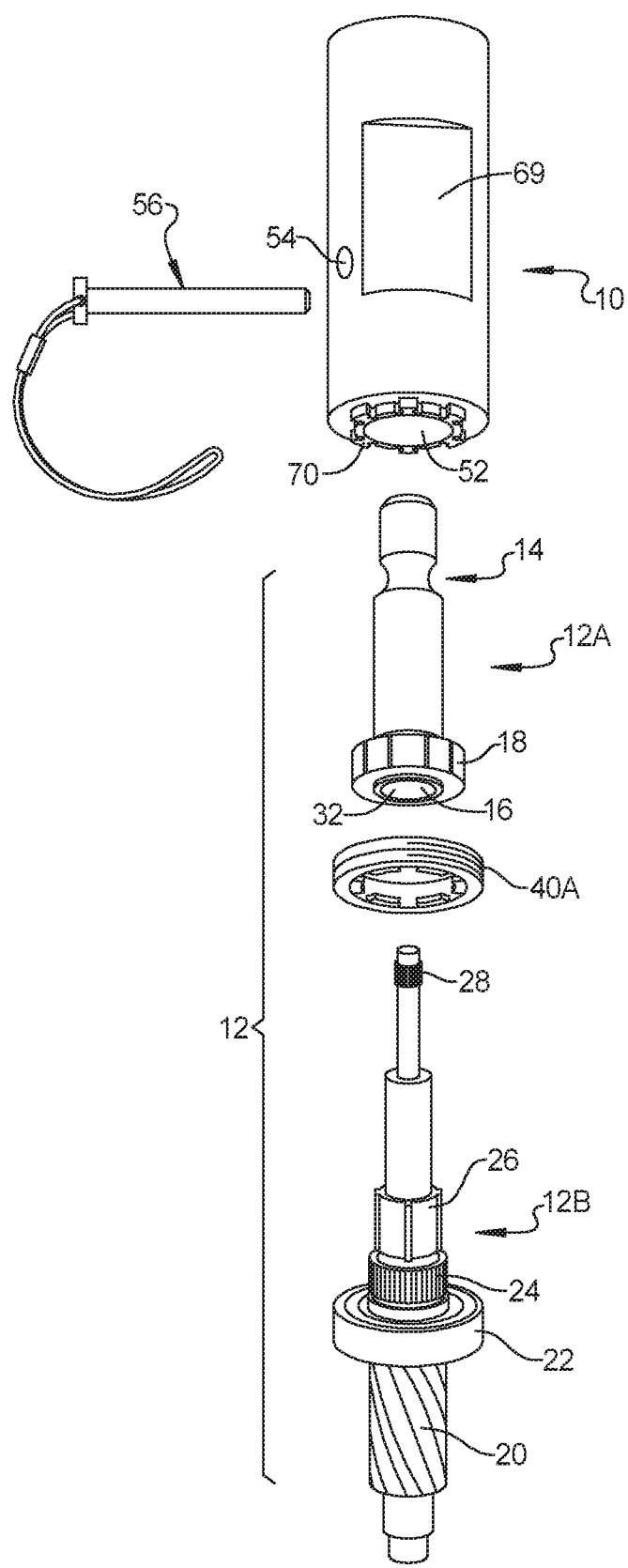
FIG. 1 is a perspective view of a tool used to disassemble a two-piece pinion shaft assembly from a rack and pinion system according to the principles of the present disclosure.
Figure 2:
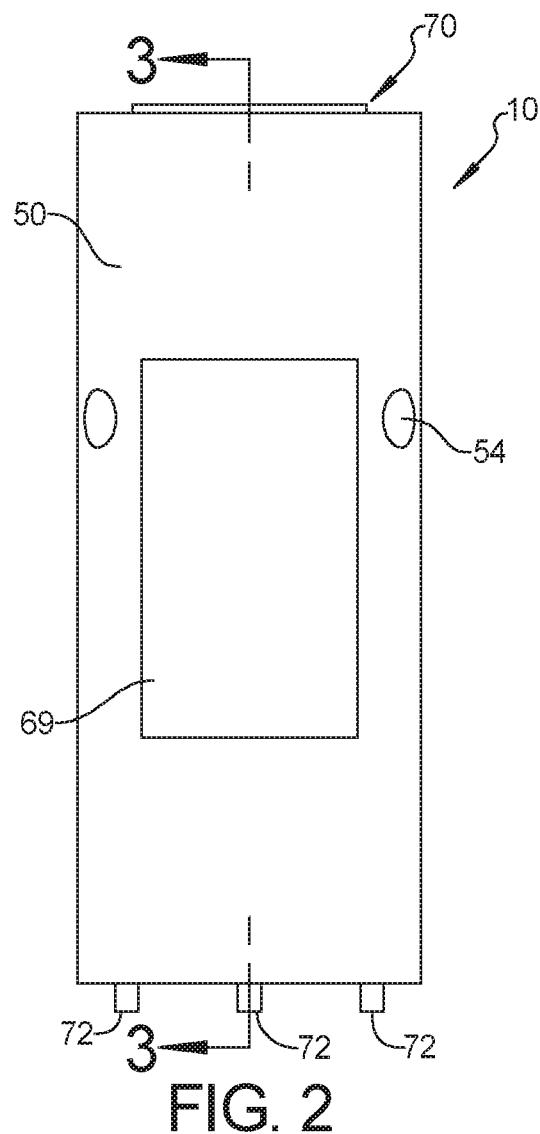
FIG. 2 is a side plan view of a pinion tool according to the principles of the present disclosure.

With reference to FIG. 1, a two-piece pinion shaft tool 10 is provided for disassembling a two-piece pinion shaft 12 from a rack and pinion system. In particular, the two-piece pinion tool 10 is used to separate a first shaft segment 12A from a second shaft segment 12B. The first shaft segment 12A can include a key way 14 on an exterior surface thereof. The first shaft segment 12A includes a hollow interior 16 that receives a first end of the second shaft segment 12B therein. A magnetic plate bundle 18 is optionally disposed on the first shaft segment 12A and is used for determining a rotational position of the pinion shaft 12. The second shaft segment 12B includes a helical gear section 20, a bearing section 22, a first splined section 24 and a second splined section 26. The first splined section 24 can be used to be connected to an optional plastic cup 30 (shown in FIGS. 6 and 7) that can receive the magnetic plate bundle 18. The second splined section 26 can be used to engage the second shaft segment 12B with an internal spline section 32 within the hollow interior 16 of the first shaft segment 12A.

Figure 7:
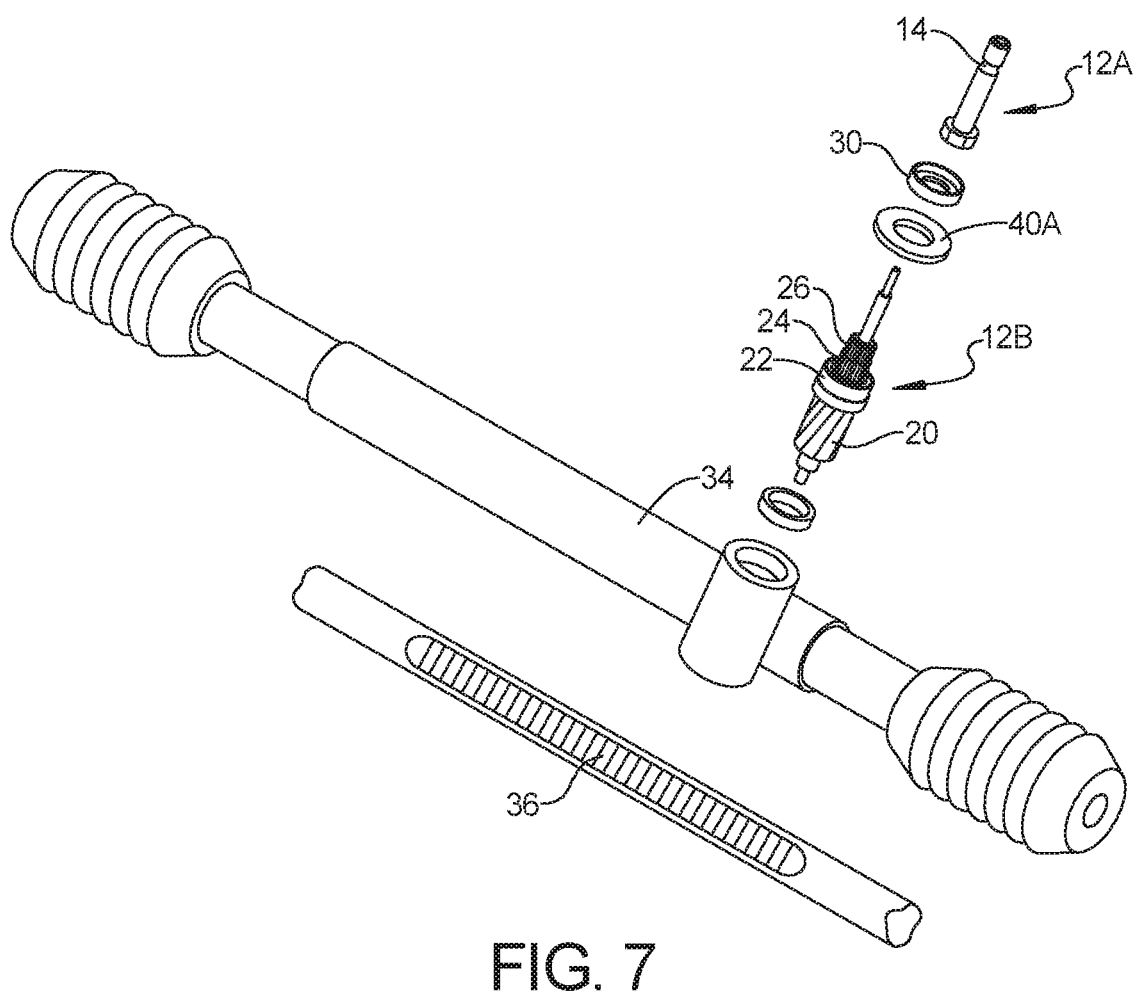
FIG. 7 is an exploded perspective view of a conventional rack and pinion system utilizing a two-piece pinion shaft.

With reference to FIG. 7, the second shaft segment 12B is inserted into the rack and pinion housing 34 with the helical gear section 20 meshingly engaged with a rack 36 (shown external to the housing in the exploded perspective view of FIG. 7), so that rotation of the helical gear section 20 causes the rack 36 to traverse laterally across the helical gear section 20, as is known in the art. A uniquely designed retaining nut 40A (shown in detail in FIGS. 8A, 8B) is provided with external threads 42 that engage with internal threads within the rack and pinion housing 34 wherein the retaining nut 40A, 40B is disposed against the bearing section 22 and retains the second shaft segment 12B within the rack and pinion housing 34. The plastic cup 30 can then be inserted over the first splined section 24 and the first shaft segment 12A is press fit over the second shaft segment 12B with the internal spline section 32 engaged with the second splined section 26.

Figure 3:
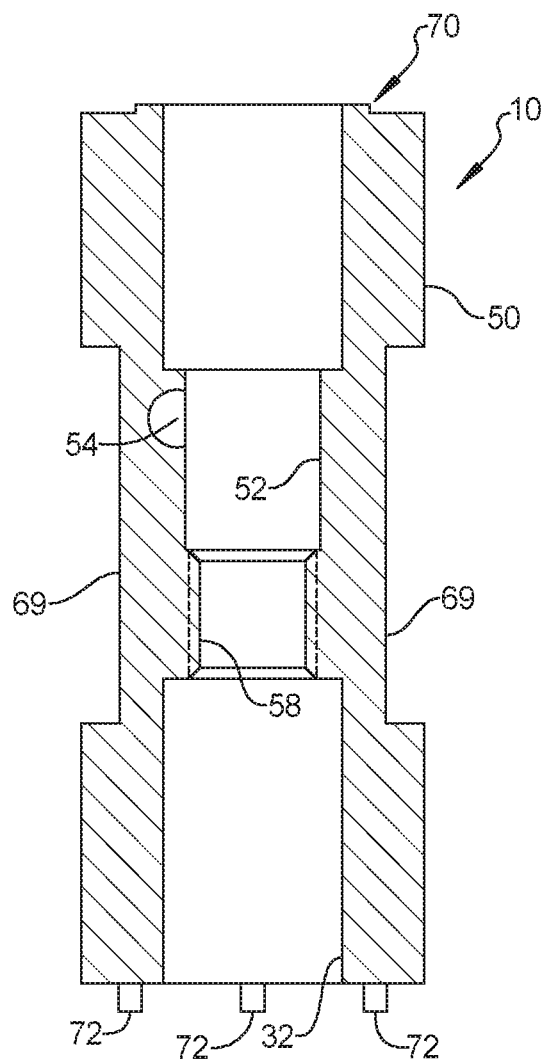
FIG. 3 is a cross-sectional view of the pinion tool shown in FIG. 2.
Figure 6:
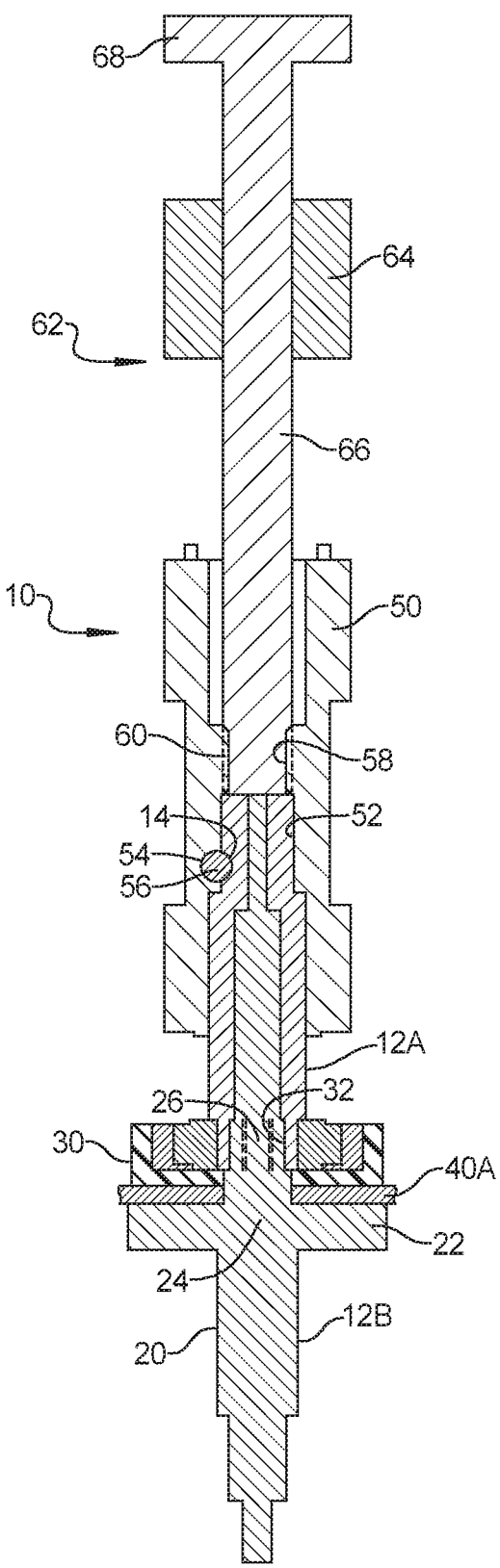
FIG. 6 is a schematic cross-sectional view of the pinion tool being utilized to separate the components of a two-piece pinion shaft.

As shown in FIGS. 2-5, the two-piece pinion tool 10 includes a tool body 50 having an axial opening 52 for receiving the pinion shaft segment 12A. The tool body 50 can be made from metal and includes a transverse opening 54 there through for receiving a pin 56 (FIG. 1) that is inserted through the opening 54 and is aligned with and engaged with the key way 14 in the first shaft segment 12A. As best shown in FIG. 3, the two-piece pinion tool 10 further includes an internally threaded section 58 adapted to be connected to a threaded end 60 of a slide hammer 62, as shown in FIG. 6. The slide hammer 62 is used to separate the first shaft segment 12A from a second shaft segment 12B by sliding a hammer portion 64 along the slide portion 66 against a stop portion 68 in order to impart an impact to the first shaft portion 12A to disengage a press fit between the first and second shaft segments 12A, 12B.

Figure 4:
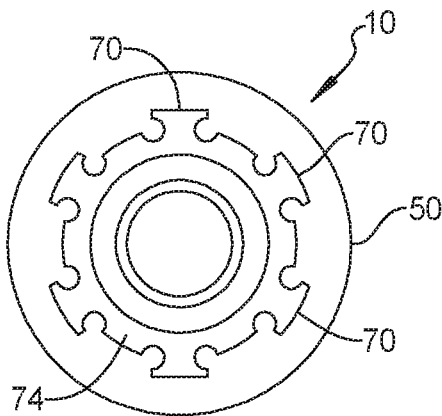
FIG. 4 is an end plan view of a first end of the pinion tool shown in FIG. 2.
Figure 5:
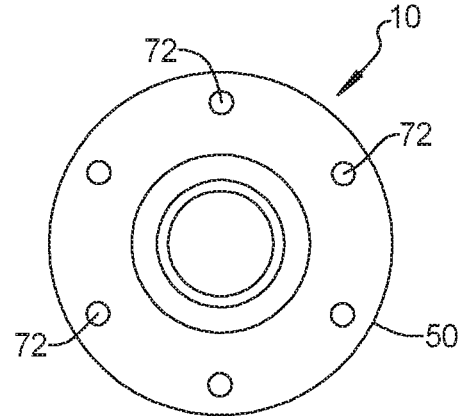
FIG. 5 is an end plan view of a second end of the pinion tool shown in FIG. 2.
Figure 8A:
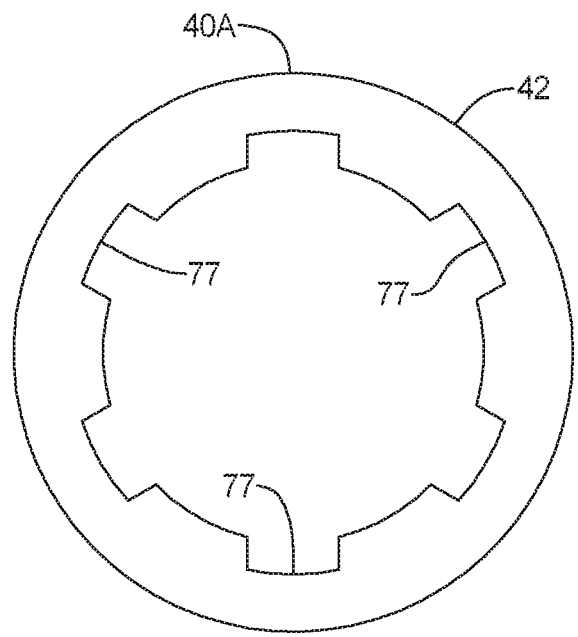
FIG. 8A is a plan view of a first retainer nut and FIG. 8B is a plan view of a second retainer nut that are engageable by the alternative fingers provided on the ends of the pinion tool.
Figure 8B:
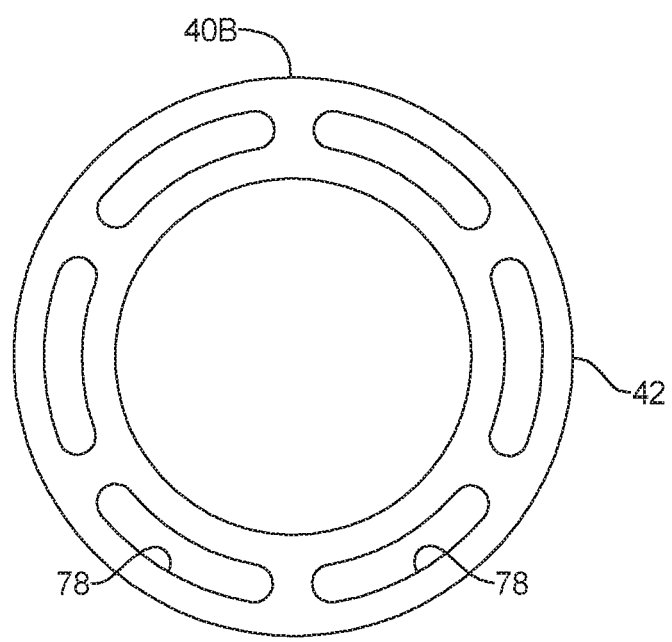

The tool body 50 includes a pair of flats 69 on the outer surface of the tool body 50. The tool 10 further includes a plurality of fingers 70, 72 arranged at each end of the tool body 10 that are each designed for engaging two alternative unique styles of retainer nuts 40A, 40B, as shown in FIG. 8A, 8B, respectively. As shown in FIGS. 8A and 8B, the retainer nuts 40A, 40B include the external threads 42 and the retainer nut 40A includes internal keys 77 while the retainer nut 40B includes elongated slots 78. At one end of the tool 10, the fingers 70 protrude from the end of the tool body 50 and are arranged to extend radially outward from a center ring portion 74, as shown in FIG. 4, for engaging the internal keys 77 of the first style nut 40A (as shown in FIG. 8A). At a second end of the tool 10, the fingers 72 are in a form of a plurality of pins 76 for engaging the elongated slots 78 in the second style of retainer nut 40B (shown in FIG. 8B). The pins 76 can be integrally formed with the tool body 50 or can be separately formed pins that are received in bores in the end of the tool body. The flats 68 on the side surface of the tool body 50 assist in rotating the two-piece pinion tool 10 to drive the retaining nuts 40A, 40B for tightening or loosening the retaining nuts 40A, 40B.

The two-piece pinion shaft tool 10 allows a pinion shaft 12 to be disassembled from the rack and pinion housing 34 by initially pulling the first shaft segment 12A away from the second shaft segment 12B. The tool 10 is slid over the shaft assembly 12 which is received in the axial opening 52. The pin 56 is inserted through the transverse opening 54 and engaged with the key way 14 in the first shaft portion 12A. The external threads 60 of the slide portion 66 of the slide hammer 62 is threadedly engaged with the threads 58 of the two-piece pinion shaft tool 10. The hammer portion 64 is slid along the slide portion 66 into the stop 68 to impart an impact to the first shaft portion 12A to separate it from the second shaft portion 12B. Once the two-piece pinion shaft 12 is separated into its two shaft segments 12A, 12B and the first shaft segment 12A is removed, the plastic cup 30 (if used) can be removed. The retainer nut 40A or 40B can then be removed from the rack and pinion housing 34, by engaging the appropriate end of the tool body 50, and the two-piece pinion shaft tool 10 is turned by using the flats 69 on the surface of the tool body 50. Once the retainer nut 40A, 40B is removed from the rack and pinion housing 34, the second shaft segment 12B can be removed from rack and pinion housing 34.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A two-piece pinion shaft tool for disassembling a two-piece pinion shaft from a rack and pinion housing, comprising:

a tool body having an axial opening extending along an axis of the tool body and a transverse opening at least partially communicating with the axial opening;

a pin is inserted in the transverse opening for engaging a keyway in a first shaft portion of the two-piece pinion shaft; and a slide hammer having a slide portion which is connected to the tool body and having a hammer portion disposed on the slide portion, wherein the tool body includes a first end with a first plurality of fingers extending axially from the tool body.

2. The two-piece pinion shaft tool according to claim 1, wherein the tool body includes a second end with a second plurality of fingers extending axially from the tool body.

3. The two-piece pinion shaft tool according to claim 1, wherein the tool body includes a pair of tool engaging flats on an outer surface thereof.

4. A two-piece pinion shaft tool for disassembling a two-piece pinion shaft from a rack and pinion housing, comprising:

a tool body having an axial opening extending along an axis of the tool body and a transverse opening at least partially communicating with the axial opening;

a pin is inserted in the transverse opening for engaging a keyway in a first shaft portion of the two-piece pinion shaft; and a slide hammer having a slide portion which is connected to the tool body and having a hammer portion disposed on the slide portion, wherein the tool body includes internal threads within the axial opening and the slide portion of the slide hammer includes external threads engaged with the internal threads of the tool body.

5. The two-piece pinion shaft tool according to claim 1, wherein the tool body includes internal threads within the axial opening and the slide portion of the slide hammer includes external threads engaged with the internal threads of the tool body.

6. The two-piece pinion shaft tool according to claim 4, wherein the tool body includes a first end with a first plurality of fingers extending axially from the tool body.

7. The two-piece pinion shaft tool according to claim 4, wherein the tool body includes a second end with a second plurality of fingers extending axially from the tool body.

8. The two-piece pinion shaft tool according to claim 4, wherein the tool body includes a pair of tool engaging flats on an outer surface thereof.

\* \* \* \* \*